(12) United States Patent
Buzzard

(10) Patent No.: US 9,222,491 B2
(45) Date of Patent: Dec. 29, 2015

(54) HYDRAULIC PUMP START SYSTEM AND METHOD

(71) Applicant: John N. Buzzard, Rockford, IL (US)

(72) Inventor: John N. Buzzard, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 457 days.

(21) Appl. No.: 13/852,526

(22) Filed: Mar. 28, 2013

(65) Prior Publication Data

US 2014/0294604 A1    Oct. 2, 2014

(51) Int. Cl.
| | |
|---|---|
| *F15B 20/00* | (2006.01) |
| *B64D 41/00* | (2006.01) |
| *F02C 7/32* | (2006.01) |
| *B60L 1/00* | (2006.01) |

(52) U.S. Cl.
CPC .............. *F15B 20/00* (2013.01); *B64D 41/00* (2013.01); *B64D 41/007* (2013.01); *F02C 7/32* (2013.01); *B64D 2221/00* (2013.01); *F05D 2220/34* (2013.01); *F05D 2220/50* (2013.01); *F05D 2260/85* (2013.01)

(58) Field of Classification Search
None
See application file for complete search history.

(56) References Cited

U.S. PATENT DOCUMENTS

| | | |
|---|---|---|
| 2002/0113167 A1 | 8/2002 | Albero et al. |
| 2009/0127855 A1 | 5/2009 | Shander et al. |
| 2010/0026089 A1 | 2/2010 | Anghel et al. |

FOREIGN PATENT DOCUMENTS

| | | |
|---|---|---|
| GB | 2451575 | 2/2009 |
| GB | 2491982 A | 12/2012 |
| WO | 9900884 A1 | 1/1999 |

OTHER PUBLICATIONS

Partial European Search Report for Application No. 14160961.0-1754. Mailed on Jul. 18, 2014. 6 pages.
European Extended Search Report, Issued Nov. 10, 2014 in corresponding EP Application No. 14160961.0.

*Primary Examiner* — Robert Deberadinis
(74) *Attorney, Agent, or Firm* — Cantor Colburn LLP

(57) ABSTRACT

Embodiments are directed to powering a hydraulic motor pump by powering the hydraulic motor pump from a main bus when power is available from the main bus, powering the hydraulic motor pump from an auxiliary power unit starter motor controller during a start-up of the hydraulic motor pump when power from the main bus is unavailable, and powering the hydraulic motor pump from a generator different than the auxiliary power unit subsequent to starting-up the hydraulic motor pump.

19 Claims, 3 Drawing Sheets

HYDRAULIC PUMP START SYSTEM AND METHOD

BACKGROUND

Aircraft hydraulic systems may be driven by one or more sources. For example, referring to FIG. 1, output hydraulic power may be provided by engine driven sources 102 or (104) electric motor driven sources 106. In the event of failure of unavailability of the engine driven sources (e.g., pumps) 102, the hydraulic power may be provided by the electric motor driven sources (e.g., pumps) 106. The engine driven sources 102 and the electric motor driven sources 106 may, in turn, be driven by other engines referred to in FIG. 1 as "main engines."

In order to provide an alternate source of electric power (e.g., in the event that the main engines fail or are unavailable), a Ram Air Turbine (RAT) may be included. In some instances (e.g., under some flight conditions), the RAT might not provide sufficient power to start the electric motor driven sources/pumps 106. For example, the electric motor driven sources 106 may impose high current inrush and breakaway torque requirements at turn-on. As a result, an overload condition imposed on the RAT can have adverse effects on an emergency electric system, and may result in a loss of hydraulic power on the aircraft. Alternatively, the RAT could be sized to provide sufficient power, however doing so would result in additional weight being added to the aircraft.

BRIEF SUMMARY

Embodiments are directed to a method for powering a hydraulic motor pump comprising: powering the hydraulic motor pump from a main bus when power is available from the main bus, powering the hydraulic motor pump from an auxiliary power unit starter motor controller during a start-up of the hydraulic motor pump when power from the main bus is unavailable, and powering the hydraulic motor pump from a generator different than the auxiliary power unit subsequent to starting-up the hydraulic motor pump.

Embodiments are directed to a system comprising: a hydraulic motor pump configured to drive one or more hydraulic loads, a power bus configured to be selectively coupled to the hydraulic motor pump, a main bus configured to be selectively coupled to the power bus, a generator configured to be selectively coupled to the power bus, and an auxiliary power unit starter motor controller configured to selectively provide power to either the hydraulic motor pump or an auxiliary power unit.

Additional embodiments are described below.

BRIEF DESCRIPTION OF THE DRAWINGS

The present disclosure is illustrated by way of example and not limited in the accompanying Figures, in which.

DETAILED DESCRIPTION

Figure 1:
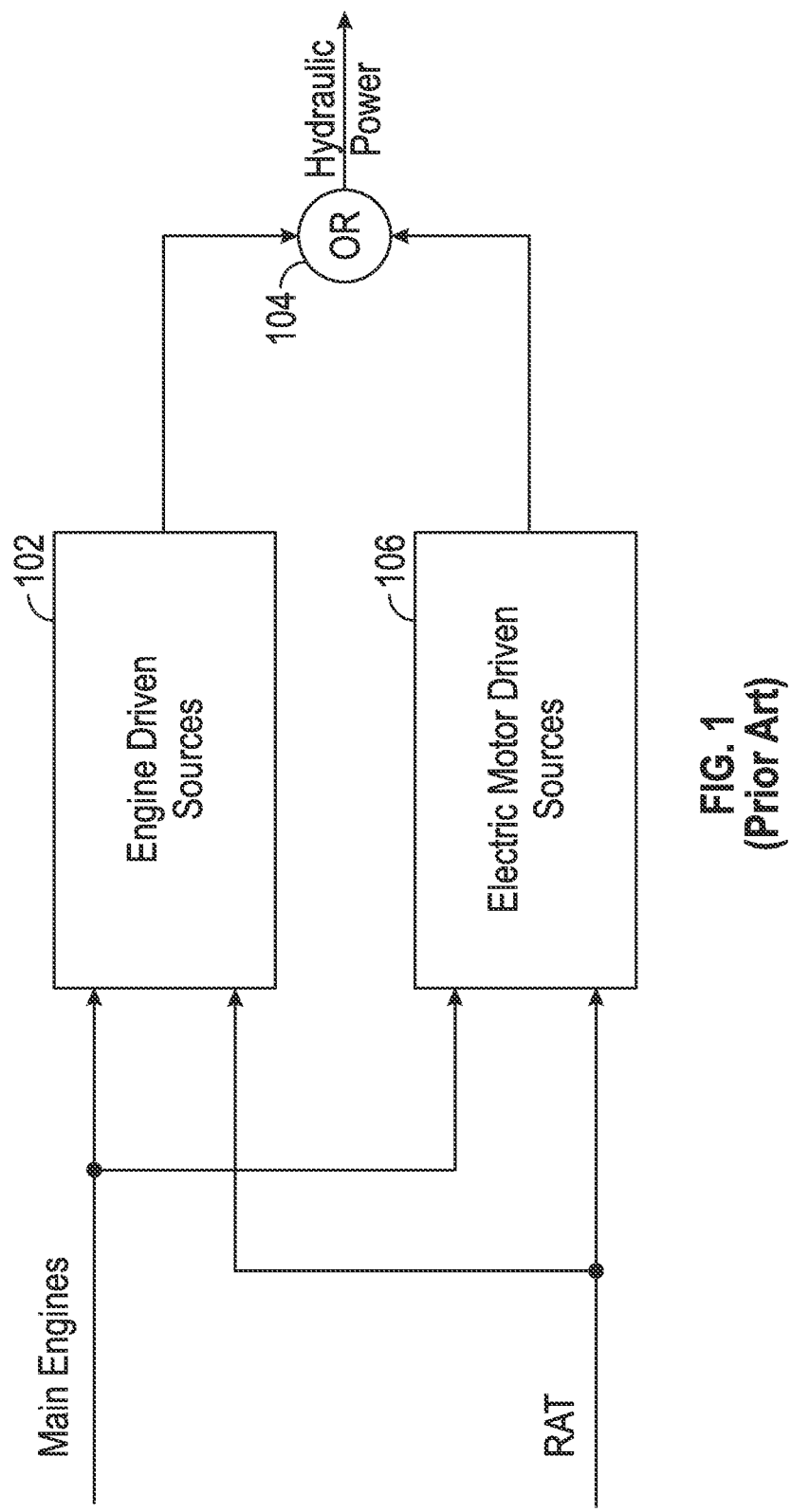
FIG. 1 illustrates an aircraft hydraulic system in accordance with the prior art.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities, components, and/or devices may refer to either a direct connection or an indirect connection.

In accordance with various embodiments of the disclosure, a hydraulic electric motor pump may be started by a motor controller, such as an auxiliary power unit (APU) starter motor controller. The APU motor controller may start the hydraulic electric motor pump using a battery as a power source. Once the hydraulic electric motor pump is running, the hydraulic electric motor pump may be driven by (e.g., power for the hydraulic electric motor pump may be sourced from) a Ram Air Turbine (RAT) generator. In this manner, the RAT generator might not be overloaded during hydraulic electric motor pump starting, which may help to ensure that emergency electric system power and hydraulic power is available.

Figure 2:
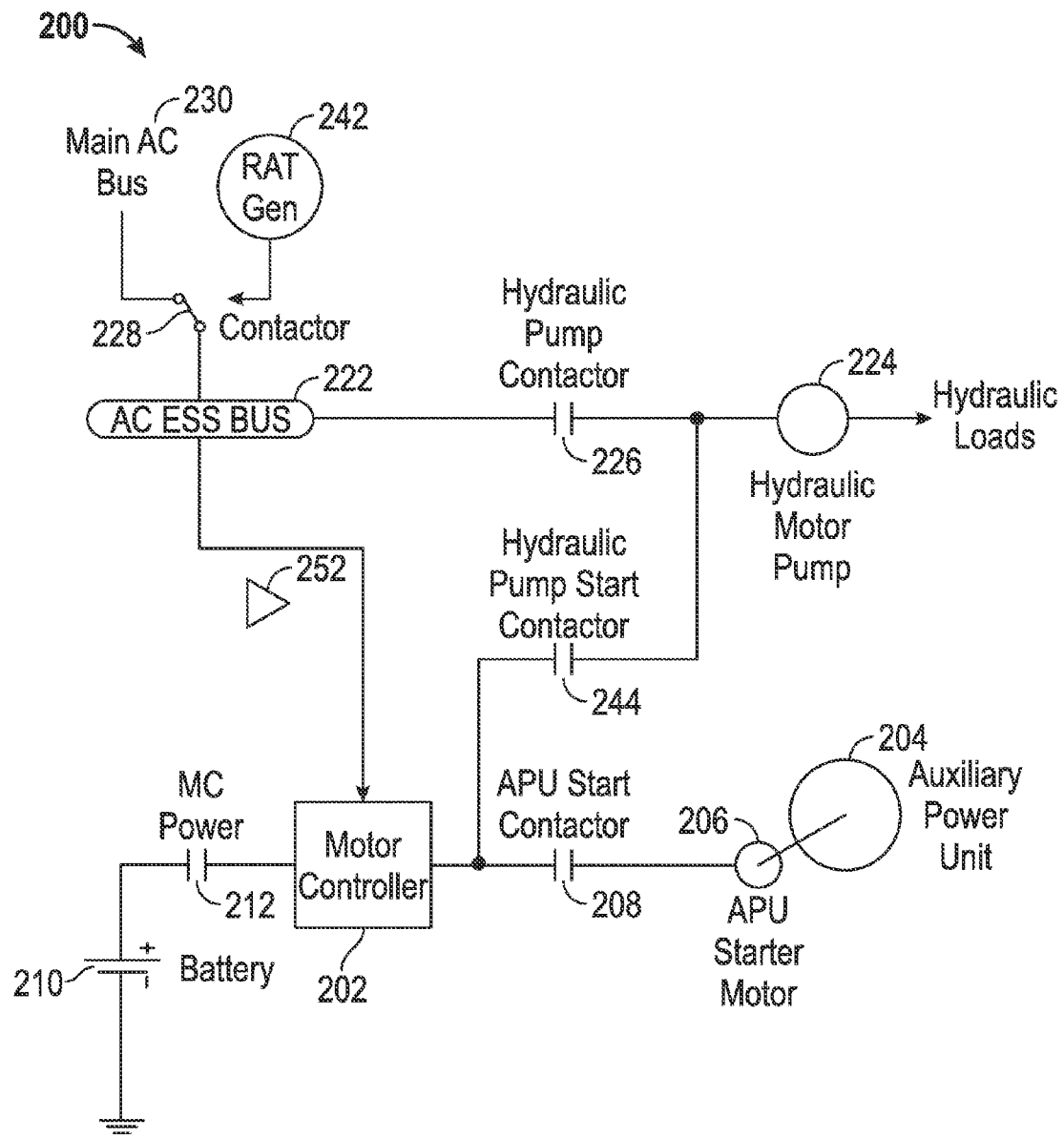
FIG. 2 illustrates an aircraft system in accordance with one or more embodiments.

Turning now to FIG. 2, an exemplary aircraft system 200 in accordance with one or more embodiments is shown. The role and function of the various components and devices of the system 200 is described below in further detail.

The system 200 may include a motor controller (MC) 202. The MC 202 may be used to source or provide power to an auxiliary power unit (APU) 204, by way of an APU starter motor 206. To facilitate such use, an APU start contactor 208 may be closed to couple the MC 202 to the APU starter motor 206. The power used to source the APU 204 may be derived from a battery 210. The battery 210 may be selectively coupled to the MC 202 based on a state of a MC power contactor 212. For example, when the MC power contactor 212 is closed, power from the battery 210 may be coupled to the MC 202, and when the MC power contactor 212 is open, the battery 210 may be isolated from the MC 202. When the MC 202 is not providing power to the APU 204, the APU start contactor 208 may be opened to isolate the APU starter motor 206 from the MC 202.

The APU 204 may be used to drive one or more loads. Typically, the APU 204 is used when an aircraft is on the ground, although the APU 204 can be used to drive loads during flight.

The system 200 may include an aircraft essential bus (AC ESS BUS) 222. The AC ESS BUS 222 may be coupled to one or more loads deemed essential to flight, such as avionics, flight controls, and the like. The AC ESS BUS 222 may be used to provide power to a hydraulic motor pump 224, which in turn may power or drive one or more hydraulic loads, such as control surfaces on an aircraft. A hydraulic pump contactor 226 may be used to selectively couple the AC ESS BUS 222 and the hydraulic motor pump 224. When the hydraulic pump contactor 226 is closed, the AC ESS BUS 222 and the hydraulic motor pump 224 may be coupled to one another. When the hydraulic pump contactor 226 is open, the AC ESS BUS 222 may be isolated from the hydraulic motor pump 224.

When Main AC BUS 230 power is available, a switch or contactor 228 may be configured as shown in FIG. 2 to couple the ACC ESS BUS 222 to the Main AC BUS 230. Such a condition may be referred to as a so-called "normal mode" of operation, and the hydraulic motor pump 224 may receive electrical power via the Main AC BUS 230.

When Main AC BUS 230 power is unavailable (e.g., Main AC BUS 230 power is lost), a RAT generator (Gen) 242 may be engaged and the state of the contactor 228 may change such that the AC ESS BUS 222 may be coupled to the RAT Gen 242 (as opposed to the Main AC BUS 230). Such a condition may be referred to as a so-called "RAT Gen mode" of operation.

When first entering the RAT Gen mode of operation, the hydraulic motor pump 224 may be off, or may turn off as a result of the Main AC BUS 230 power being unavailable. When the hydraulic motor pump 224 is off the hydraulic motor pump 224 may represent or provide a low impedance that could subject a power source to a large in-rush current and/or startup torque that can exceed the capability of the source. To prevent a large in-rush current/startup torque being imposed on the RAT Gen 242, the hydraulic pump contactor 226 may be opened to isolate the AC ESS BUS (and hence, the RAT Gen 242) from the hydraulic motor pump 224.

To start the hydraulic motor pump 224 in the RAT Gen mode of operation, a hydraulic pump start contactor 244 may be closed and the MC power contactor 212 may be closed. In this manner, the hydraulic motor pump 224 may be coupled to the battery 210 by way of the MC 202, and power from the battery 210 may be used to start the hydraulic motor pump 224. The MC 202 may optimize the starting of the hydraulic motor pump 224 using motor control techniques, such as constant voltage over frequency control. When starting the hydraulic motor pump, the APU start contactor 208 may be open to isolate the battery 210/MC 202 from the APU starter motor 206/APU 204.

Once the hydraulic motor pump 224 is started in the RAT Gen mode of operation, the MC 202 may be used to provide power to the APU starter motor 206/APU 204, and in this respect, the APU start contactor 208 may be closed. Moreover, once the hydraulic motor pump 224 is started, the hydraulic pump start contactor 244 may be opened to isolate the MC 202 from the hydraulic motor pump 224 and the hydraulic pump contactor 226 may be closed to power the hydraulic motor pump 224 from the RAT Gen 242 (via the AC ESS BUS 222).

Thus, as described above, the hydraulic motor pump 224 may be started using power provided by the battery 210. Once the hydraulic motor pump 224 is up-and-miming, the hydraulic motor pump 224 may be powered by the RAT Gen 242. In this manner, the output power capacity (and hence, the size and weight) of the RAT Gen 242 may be made less/smaller than if the RAT Gen 242 was required to provide sufficient power to start the hydraulic motor pump 224. The battery 210 and the MC 202 may be appropriately sized to facilitate starting the hydraulic motor pump 224. The timeframe for starting the hydraulic motor pump 224 is typically short (e.g., on the order of two to ten seconds).

In some embodiments, the MC 202's output characteristics (e.g., frequency, voltage, and phase) may be matched or synchronized to the characteristics of the AC ESS BUS 222. The characteristics of the AC ESS BUS may be sensed or determined by a buffer or sensory device 252. The matching of the characteristics may be used to minimize the electrical disturbance when the input power source to the hydraulic motor pump 224 is switched, e.g., from the MC 202/battery 210 to the AC ESS BUS 222/RAT Gen 242. Minimizing the electrical disturbance may be used to protect one or more components, such as the hydraulic pump contactor 226, from being subjected to excessive voltages or currents.

Figure 3:
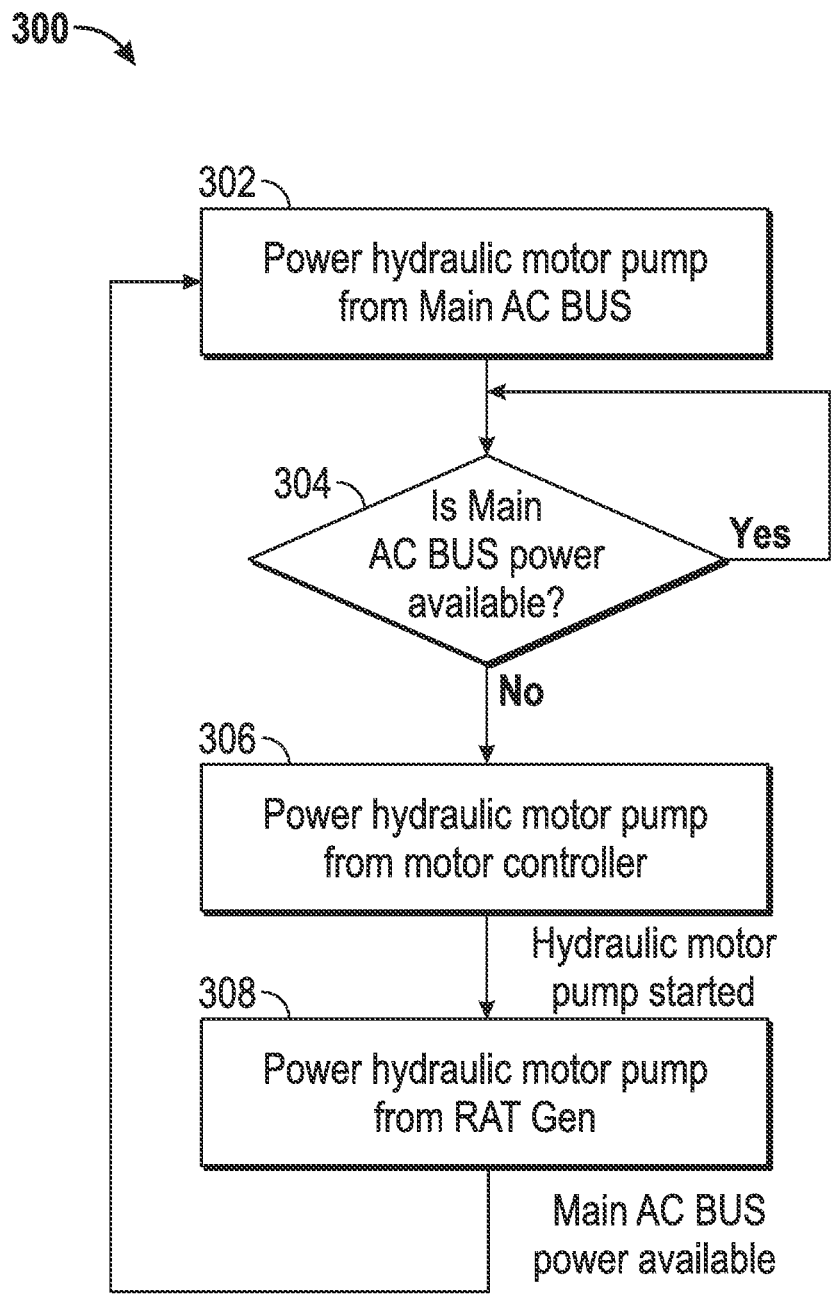
FIG. 3 illustrates an exemplary method in accordance with one or more embodiments of this disclosure.

Turning now to FIG. 3, a method 300 in accordance with one or more embodiments is shown. The method 300 may be used to selectively power a hydraulic motor pump (e.g., hydraulic motor pump 224). For purposes of convenience, the method 300 is described below in connection with the system 200 of FIG. 2. One skilled in the art would appreciate that the method 300 may be applied to or adapted for other systems, components, or devices.

In block 302, the hydraulic motor pump 224 may be powered by the Main AC BUS 230 via the AC ESS BUS 222. As part of block 302, the RAT Gen 242 may be disengaged or turned-off, the hydraulic pump contactor 226 may be closed, the hydraulic pump start contactor 244 may be open, and the contactor 228 may be positioned to couple the ACC ESS BUS 222 to the Main AC BUS 230. Assuming that APU power is not needed, the APU start contactor 208 and the MC power contactor 212 may be open; otherwise, if APU power is needed the APU start contactor 208 may be closed and the MC power contactor 212 may be closed.

In block 304, a determination may be made whether Main AC BUS 230 power is available. If so (e.g., the "yes" path is taken out of block 304), flow may remain in block 304 to continue monitoring the Main AC BUS 230 power. If Main AC BUS 230 power is unavailable (e.g., the "no" path is taken out of block 304), flow may proceed from block 304 to block 306.

In block 306, the hydraulic motor pump 224 may be powered by the MC 202/battery 210 in order to start-up or turn-on the hydraulic motor pump 224. As part of block 306, the RAT Gen 242 may be engaged or turned-on, the hydraulic pump contactor 226 may be opened, the hydraulic pump start contactor 244 may be closed, the MC power contactor 212 may be closed, the APU start contractor 208 may be opened, and the contactor 228 may be positioned to couple the ACC ESS BUS 222 to the RAT Gen 242. Once the hydraulic motor pump 224 has been started, flow may proceed from block 306 to block 308.

In block 308, the hydraulic motor pump 224 may be powered by the RAT Gen 242 via the AC ESS BUS 222. As part of block 308, the hydraulic pump contactor 226 may be closed, and the hydraulic pump start contactor 244 may be opened. Assuming that APU power is needed, the APU start contactor 208 may be closed; otherwise, if APU power is not needed the MC power contactor 212 may be opened. Flow may remain in block 308 until Main AC BUS power is restored, at which point flow may proceed from block 308 to block 302.

The method shown in FIG. 3 is illustrative. In some embodiments, one or more of the blocks or operations (or portions thereof) may be optional. In some embodiments, the blocks may execute in an order or sequence that is different from what is shown in FIG. 3. In some embodiments, one or more additional blocks not shown may be included.

Embodiments of the disclosure may be tied to one or more particular machines. For example, in some embodiments a hydraulic electric motor pump may be driven by one or more sources or devices. The sources or devices may include a motor controller and a RAT generator. The hydraulic electric motor pump may receive power from one or more sources for purposes of starting or running the hydraulic electric motor pump.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Embodiments of the disclosure may be directed to one or more systems, apparatuses, and/or methods.

Embodiments of the disclosure may be implemented using hardware, software, firmware, or any combination thereof For example, in some embodiments a memory may store instructions that, when executed by at least one processor, cause an apparatus or system to perform one or more methodological acts, such as those described herein. In some embodiments, a computer-readable medium (e.g., a transitory and/or non-transitory medium) may be used. The medium may include instructions that, when executed, cause an apparatus or system to perform one or more methodological acts, such as those described herein. In some embodiments, various mechanical components known to those of skill in the art may be utilized.

Aspects of the disclosure have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative Figures may be performed in other than the recited order, and that one or more steps illustrated may be optional in accordance with aspects of the disclosure.

What is claimed is:

1. A method for powering a hydraulic motor pump comprising:
    powering the hydraulic motor pump from a main bus when power is available from the main bus;
    powering the hydraulic motor pump from an auxiliary power unit starter motor controller during a start-up of the hydraulic motor pump when power from the main bus is unavailable; and
    powering the hydraulic motor pump from a generator different than the auxiliary power unit subsequent to starting-up the hydraulic motor pump.

2. The method of claim 1, wherein the generator comprises a Ram Air Turbine (RAT).

3. The method of claim 1, wherein when power from the main bus becomes unavailable, the generator is engaged and a position of a contactor is changed from coupling an essential bus to the main bus to coupling the essential bus and the generator.

4. The method of claim 3, wherein during the start-up of the hydraulic motor pump a second contactor is closed to couple the auxiliary power unit starter motor controller and the hydraulic motor pump, and wherein a third contactor is opened to isolate the essential bus from the hydraulic motor pump.

5. The method of claim 4, wherein when the hydraulic motor pump is powered from the generator, the second contactor is opened to isolate the auxiliary power unit starter motor controller from the hydraulic motor pump, and wherein the third contactor is closed to couple the essential bus and the hydraulic motor pump.

6. The method of claim 1, wherein the auxiliary power unit starter motor controller is coupled to a battery when powering the hydraulic motor pump.

7. The method of claim 1, further comprising:
    matching at least one output characteristic of the auxiliary power unit starter motor controller to a corresponding at least one output characteristic of the generator.

8. The method of claim 7, wherein the at least one output characteristic comprises at least one of: a frequency, a voltage, and a phase.

9. The method of claim 1, wherein the hydraulic motor pump is located on an aircraft.

10. A system comprising:
    a hydraulic motor pump configured to drive one or more hydraulic loads;
    a power bus configured to be selectively coupled to the hydraulic motor pump;
    a main bus configured to be selectively coupled to the power bus;
    a generator configured to be selectively coupled to the power bus; and
    an auxiliary power unit starter motor controller configured to selectively provide power to either the hydraulic motor pump or an auxiliary power unit.

11. The system of claim 10, wherein main bus is configured to be coupled to the power bus via a contactor when power from the main bus is available, and wherein the generator is configured to be coupled to the power bus via the contactor when power from the main bus is unavailable.

12. The system of claim 10, wherein the auxiliary power unit starter motor controller is configured to be coupled to the hydraulic motor pump via a contactor when the hydraulic motor pump is being started, and wherein the auxiliary power unit starter motor controller is configured to be isolated from the hydraulic motor pump via the contactor when the hydraulic motor pump is not being started.

13. The system of claim 10, wherein the power bus is configured to be isolated from the hydraulic motor pump via a contactor when the hydraulic motor pump is being started, and wherein the power bus is configured to be coupled to the hydraulic motor pump via the contactor when the hydraulic motor pump is not being started.

14. The system of claim 10, wherein the auxiliary power unit starter motor controller is configured to be selectively coupled to a battery via a contactor.

15. The system of claim 14, wherein the contactor is configured to be closed to couple the auxiliary power unit starter motor controller to the battery when the hydraulic motor pump is being started.

16. The system of claim 14, wherein the auxiliary power unit is configured to be selectively coupled to the auxiliary power unit starter motor controller via a second contactor.

17. The system of claim 16, wherein the second contactor is configured to be opened to isolate the auxiliary power unit starter motor controller from the auxiliary power unit when the hydraulic motor pump is being started.

18. The system of claim 10, wherein the auxiliary power unit starter motor controller is configured to match at least one output characteristic of the auxiliary power unit starter motor controller to a corresponding at least one output characteristic of the generator.

19. The system of claim 18, wherein the at least one output characteristic comprises at least one of: a frequency, a voltage, and a phase.

* * * * *